(No Model.) 6 Sheets—Sheet 1.
S. T. NEWMAN.
HAT ROUNDING MACHINE.
No. 457,057. Patented Aug. 4, 1891.
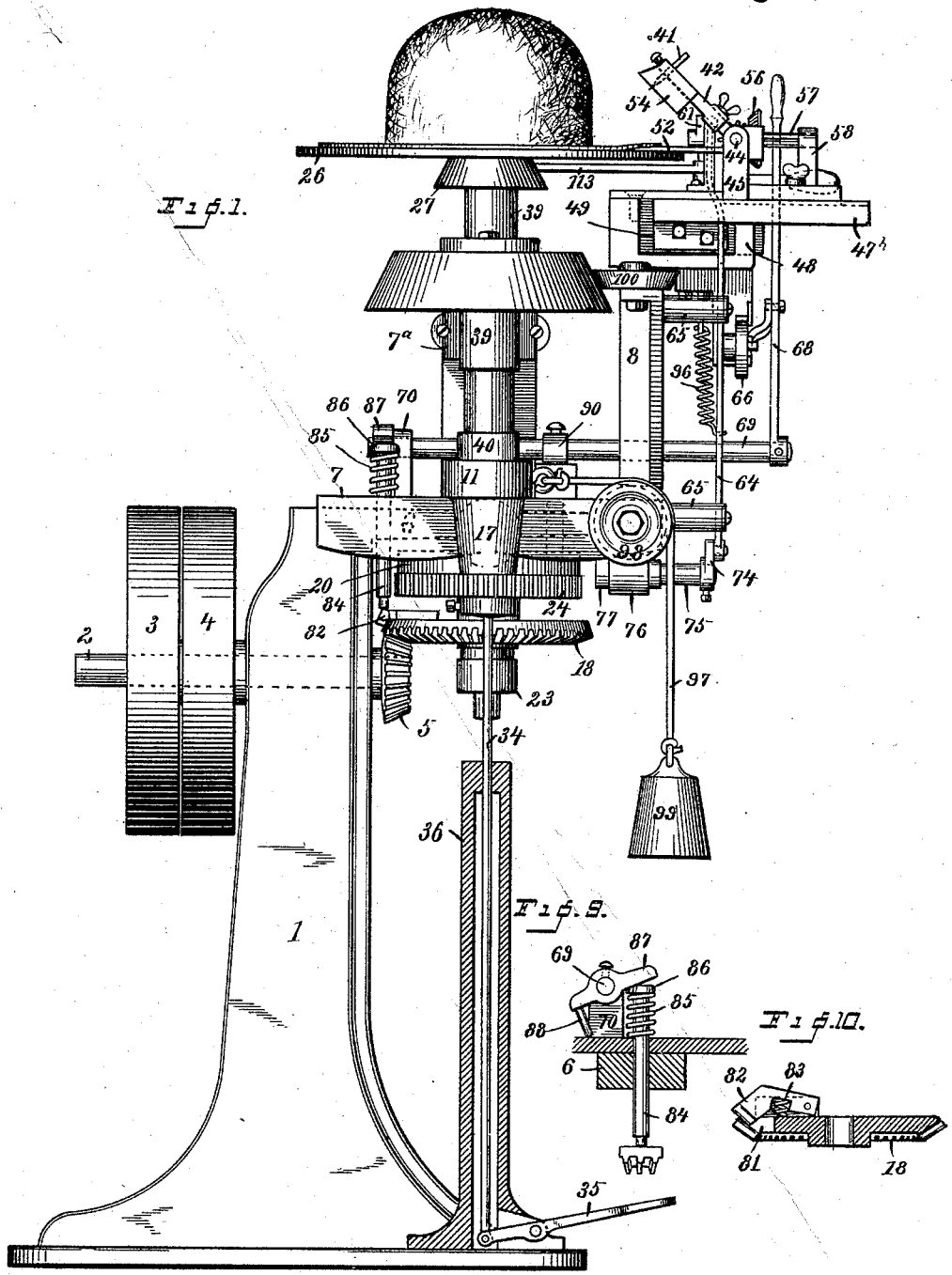
WITNESSES
C. M. Newman,
Arley S. Munson.
INVENTOR
Samuel T. Newman
By A. M. Wooster
Atty.

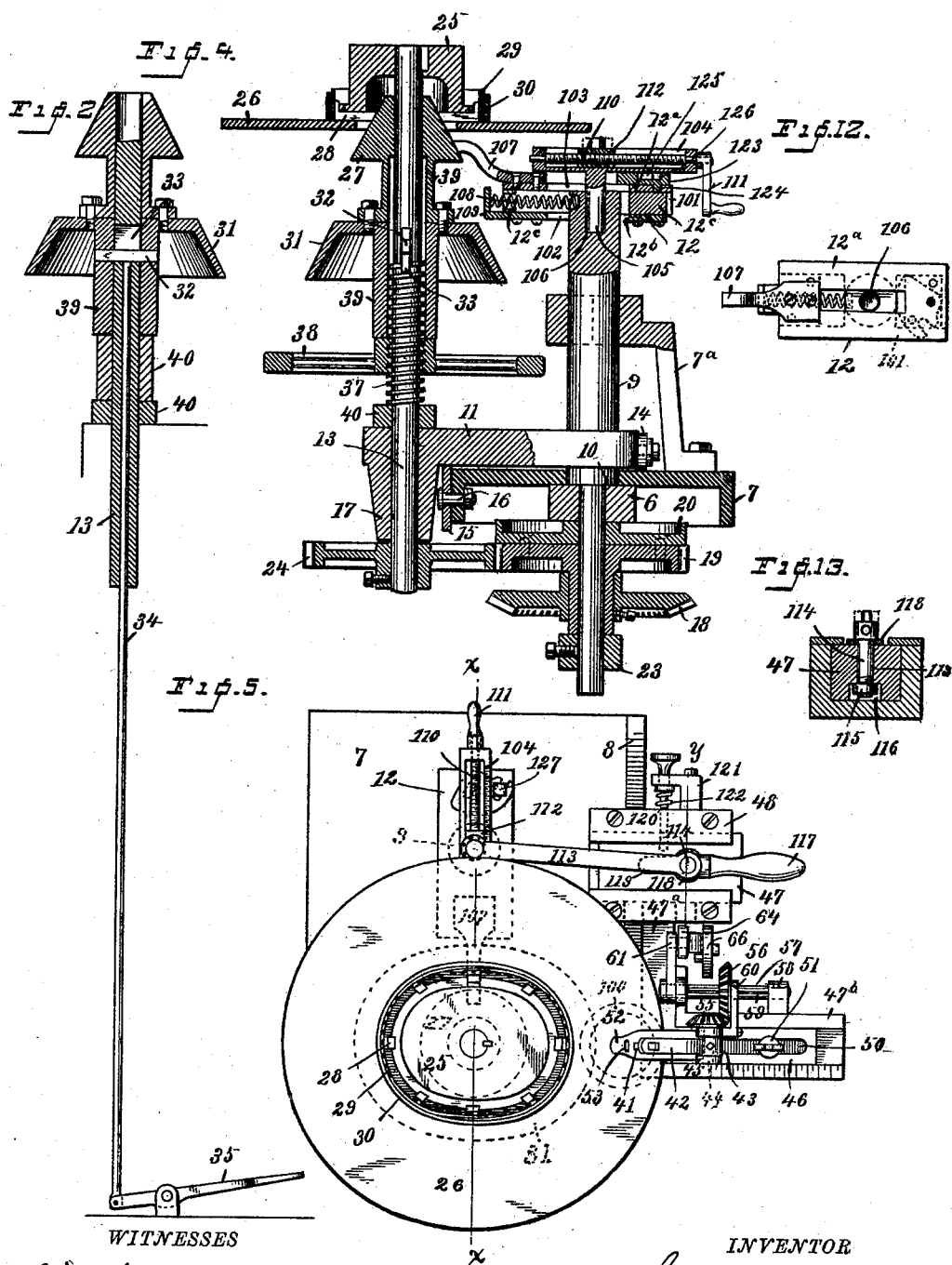

(No Model.) 6 Sheets—Sheet 3.
S. T. NEWMAN.
HAT ROUNDING MACHINE.
No. 457,057. Patented Aug. 4, 1891.
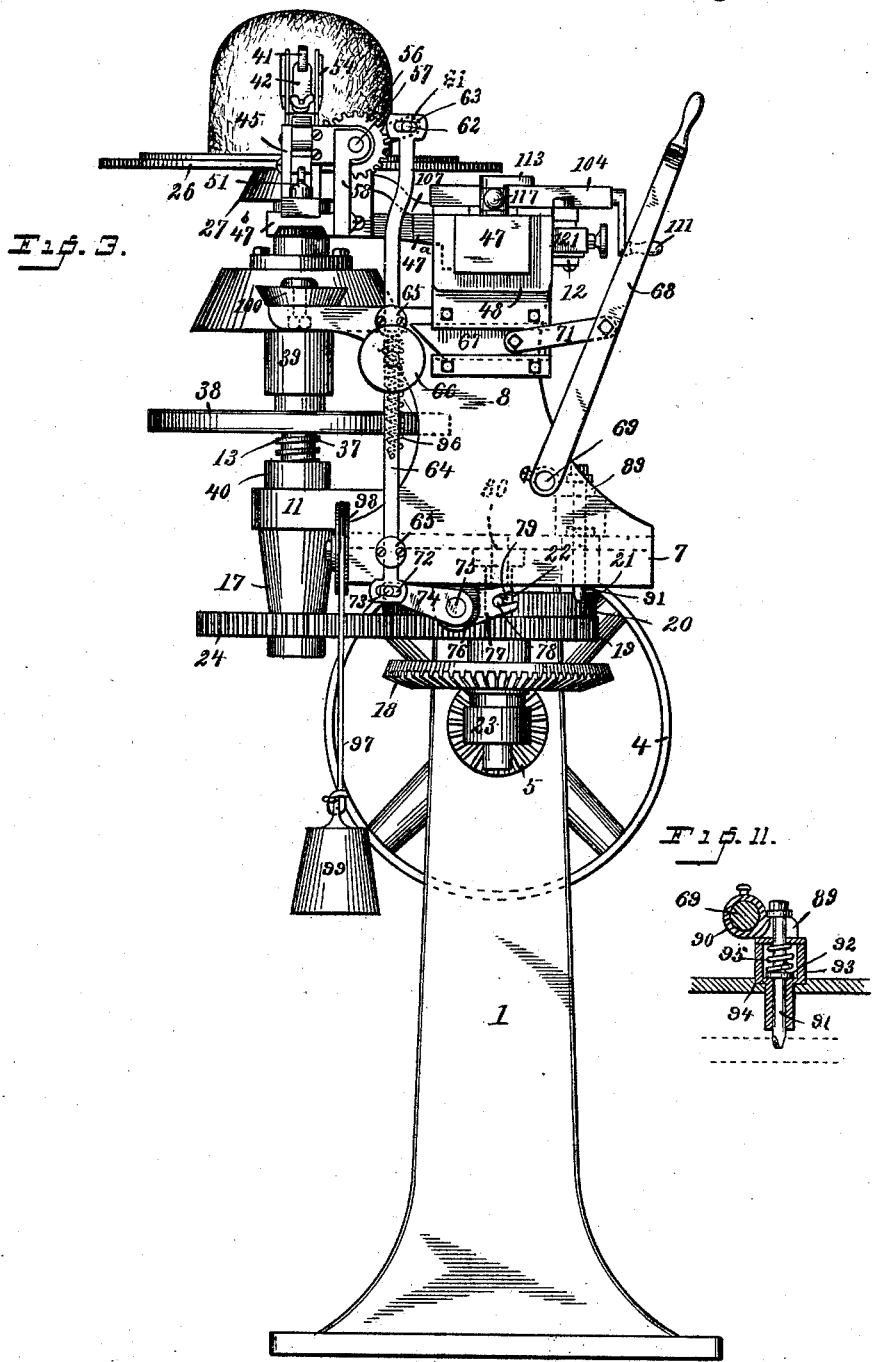
WITNESSES
C. M. Newman,
Asley T. Munson.
INVENTOR
Samuel T. Newman
By H. M. Wooster
Atty.

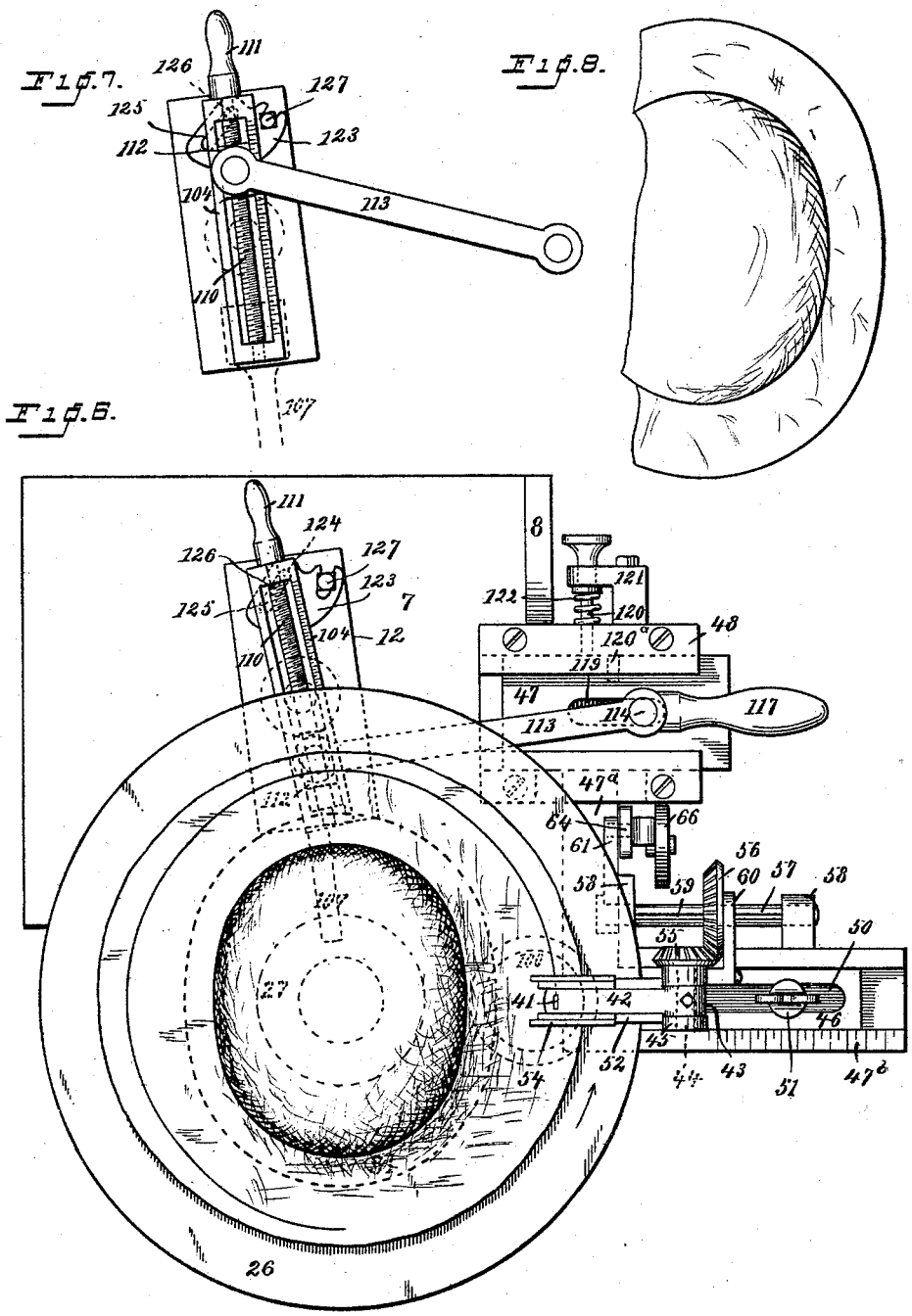

(No Model.) 6 Sheets—Sheet 5.
S. T. NEWMAN.
HAT ROUNDING MACHINE.
No. 457,057. Patented Aug. 4, 1891.
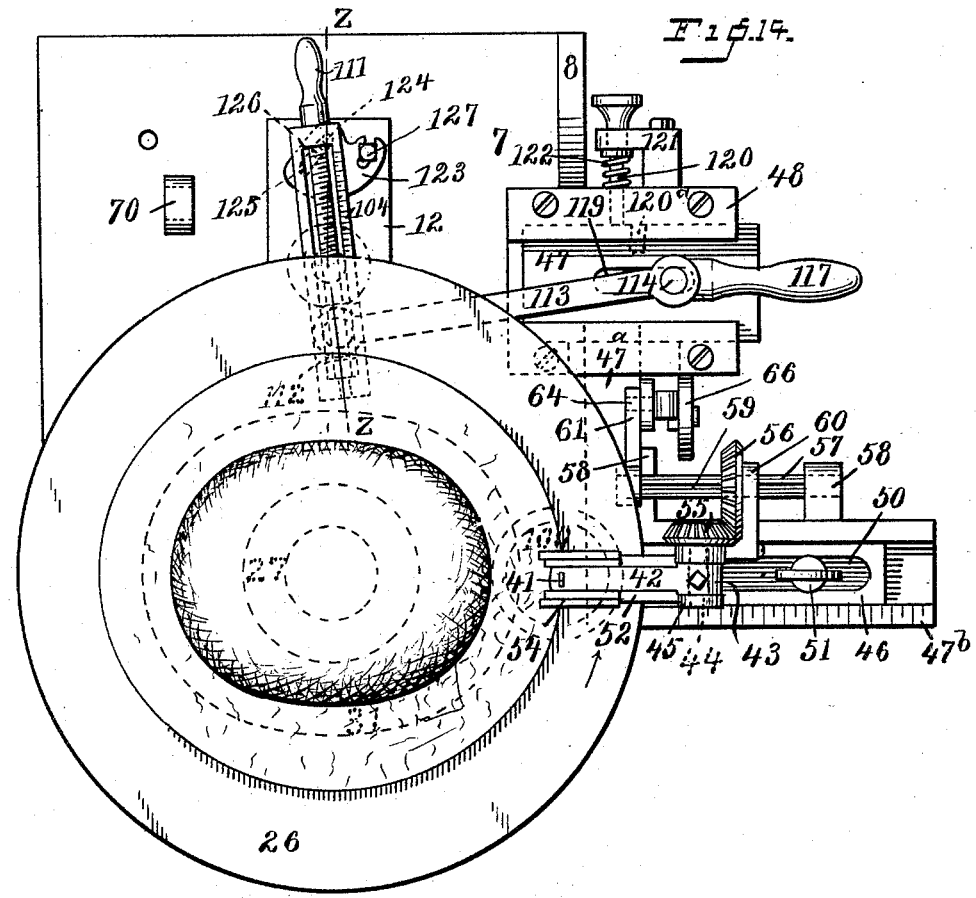
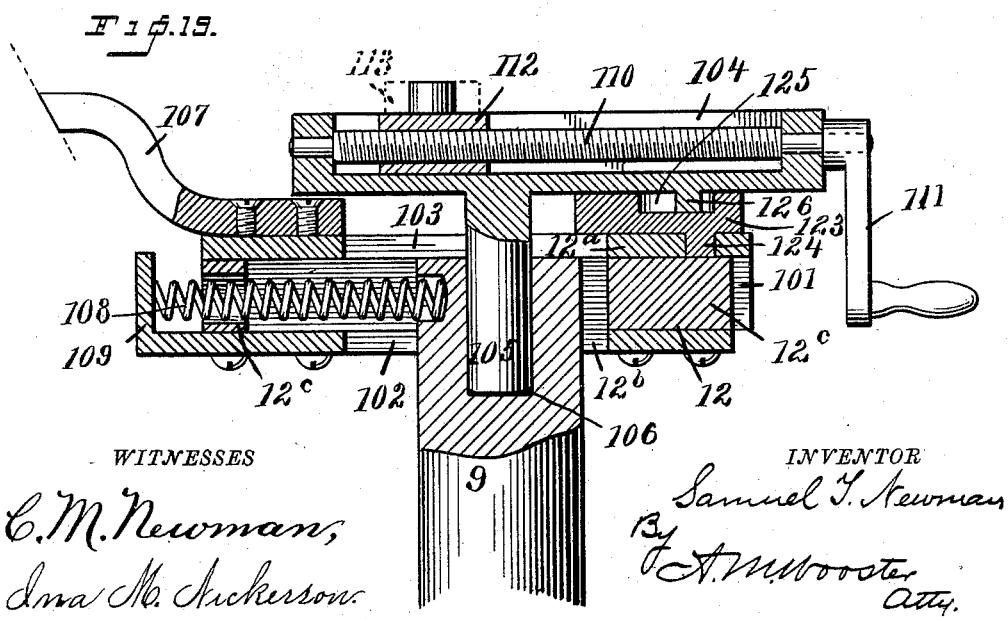
WITNESSES
C. M. Newman,
Ina M. Nickerson.
INVENTOR
Samuel T. Newman
By F. M. Wooster
Atty.

(No Model.) 6 Sheets—Sheet 6.

S. T. NEWMAN.
HAT ROUNDING MACHINE.

No. 457,057. Patented Aug. 4, 1891.

WITNESSES
C. M. Newman
Ina M. Nickerson

INVENTOR
Samuel T. Newman
By H. M. Wooster
Atty.

UNITED STATES PATENT OFFICE.

SAMUEL T. NEWMAN, OF DANBURY, CONNECTICUT.

HAT-ROUNDING MACHINE.

SPECIFICATION forming part of Letters Patent No. 457,057, dated August 4, 1891.

Application filed January 16, 1891. Serial No. 377,990. (No model.)

*To all whom it may concern:*

Be it known that I, SAMUEL T. NEWMAN, a citizen of the United States, residing at Danbury, in the county of Fairfield and State of Connecticut, have invented certain new and useful Improvements in Hat-Rounding Machines; and I do hereby declare the following to be a full, clear, and exact description of the invention, such as will enable others skilled in the art to which it appertains to make and use the same.

My invention has for its object to simplify, cheapen, and to generally improve the construction and operation of this class of machines—that is, machines for rounding or cutting down the rough edges of the brims of hats after blocking to the required size for curling, setting, and the various operations of finishing.

The main object in view in developing this invention has been to produce a machine that may be readily adjusted to all sizes and styles of hats and that is capable of doing perfect work at a high rate of speed, avoiding at the same time the complicated and expensive construction of the various machines of this class heretofore placed upon the market.

With these ends in view I have devised the simple and novel construction which I will now describe, referring by numerals to the accompanying drawings, forming part of this specification, in which—

Figure 16:
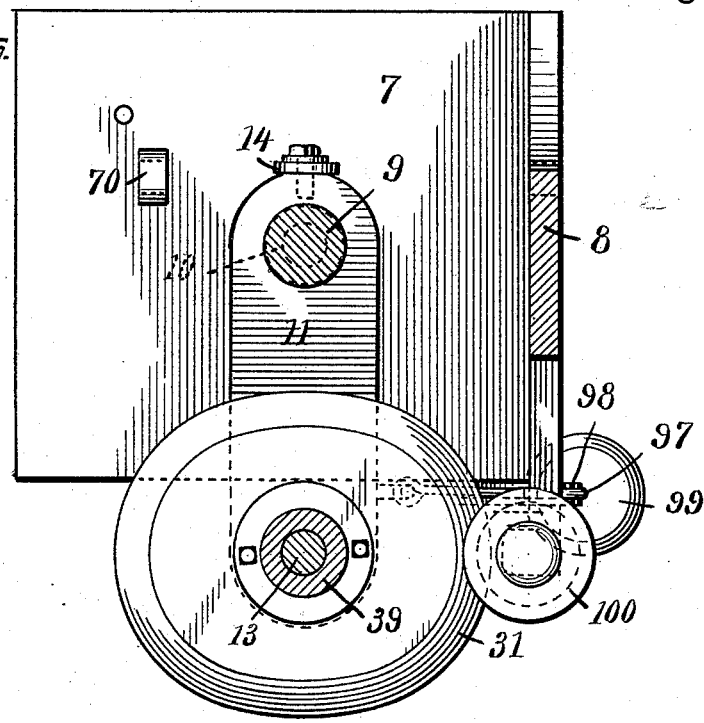
Figure 17:
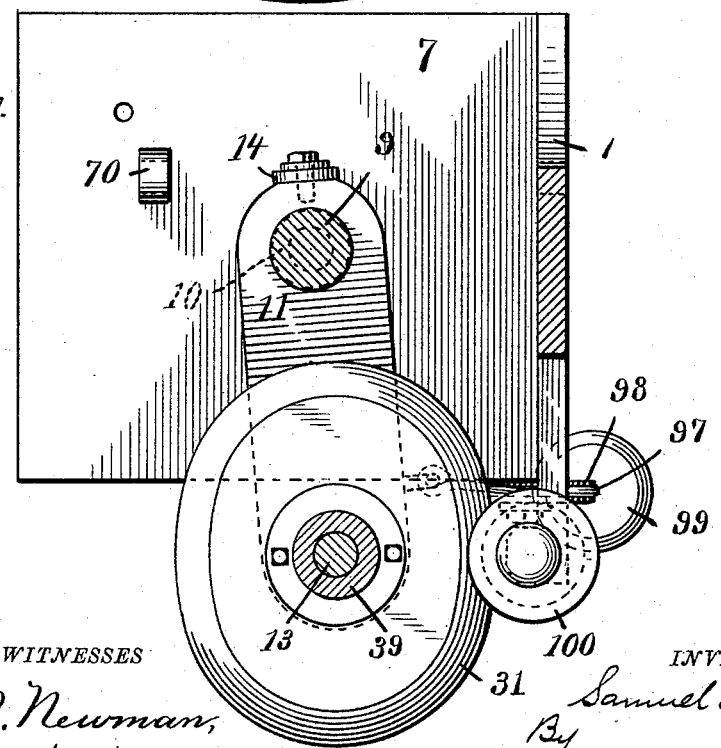

Figure 1 is a side elevation of the machine complete, one form of mechanism for raising the cams to operate the holding-slides and to determine the position of the cutter being shown partly in section and partly in elevation; Fig. 2, a detail sectional view illustrating a portion of the raising mechanism not shown in Fig. 1; Fig. 3, a front elevation of the entire machine, showing another form of mechanism for raising the cams to operate the holding-slides and to determine the position of the cutter; Fig. 4, a section through the operative parts of the machine on the line indicated by $x$ $x$ in Fig. 5, the form of raising mechanism corresponding with Fig. 3; Fig. 5, a plan view of the machine complete, the parts being in the starting position and adjusted to cut a brim the same width all the way around; Fig. 6, a plan view, on an enlarged scale, with a hat-body upon the table, illustrating the operation of rounding a brim, the parts being adjusted to cut a brim widest at the sides, so that a curl may be formed, and also illustrating the operation of the automatic mechanism which causes the cutter when once adjusted to cut a brim of the same width upon all sizes of hats; Fig. 7, a detail plan view illustrating an adjustment of parts to cut a brim narrowest at the sides; Fig. 8, a partial plan view of a hat-body with a brim cut so as to be narrowest at the sides as by the adjustment in Fig. 7; Figs. 9 and 10, (see Sheet 1,) detail sectional views illustrating the construction of the broken gear-wheel and mechanism by which motion is communicated to the carrying-shaft; Fig. 11, (see Sheet 3,) a detail sectional view illustrating mechanism which stops the vertical carrying-shaft at the completion of each revolution; Fig. 12, a plan view of the regulating-slide which determines the movement of the sliding carrier; Fig. 13, a detail sectional view on the line indicated by $y$ in Fig. 5; Fig. 14, a plan view similar to Fig. 6, showing the position of the parts after the rotation of the table has been completed, the hat-bed being ready for removal; Fig. 15, a section on an enlarged scale on the line $z$ $z$ in Fig. 14, the adjustment being the same as in Fig. 6—that is, so as to cut a brim widest at the sides; Fig. 16, a plan view of the table, arm, cam, and roller, the position of the parts corresponding with Fig. 14; and Fig. 17 is a similar view, the position of the parts corresponding with Fig. 6.

Similar numbers denote the same parts in all the figures.

1 denotes the main standard or frame of the machine, and 2 a shaft mounted therein, which carries fast and loose belt-pulleys 3 and 4, over which a belt (not shown) runs in use. At the inner end of this shaft is a bevel-pinion 5. At the upper end of the standard is an arm 6, to which is rigidly bolted a bed 7, having at its outer end an upright 8, which supports the sliding carrier upon which the cutter is mounted.

9 (see Fig. 4) denotes an oscillating post carrying a regulating-slide 12, presently to be described, which is mounted in the bed and arm 6, turning freely therein. The lower end of this post is preferably turned down, as shown in Fig. 4, leaving a shoulder 10, which rests upon the top of the arm. The upper end of the post is supported and steadied by a bracket 7ª, extending upward from the bed.

11 is an arm rigidly secured to the oscillating post and having a boss 17, in which a carrying-shaft 13, presently to be described, is mounted. In order to prevent the entire weight of the post, arm 11, and the vertical carrying-shaft from resting upon arm 6 at shoulder 10, I provide a roller 14 at the inner end of arm 11, which rests upon the bed, and a roller 15, mounted on a pin 16 in the side of the bed upon which the outer end of arm 11 rests, the boss 17, which supports the carrying-shaft, being of course outside of said roller.

18 denotes a broken bevel-gear; 19, an ordinary face-gear, and 20 a disk having a notch 21 in its crown, and an opening 22, (see Fig. 3,) the functions of which will presently be explained. Gears 18 and 19 and disk 20 are rigidly secured together, as is clearly shown in Fig. 4, and are mounted on the lower portion of oscillating post 9, but independently thereof—that is to say, the oscillation of the post and the rotation of the gears and disk are wholly independent of each other. The gears and disk are held in place upon the post by a collar 23, rigidly secured thereto. Bevel-gear 18 meshes with bevel-pinion 5 on shaft 2, and gear 19 meshes with a gear 24, rigidly secured at the lower end of the carrying-shaft, whereby motion is imparted thereto. At the upper end of the carrying-shaft is a block 25, which is rigidly secured in place by a key or in any suitable manner. Under the block is a table 26, upon which the brim of the hat to be trimmed rests in use and which is rigidly secured to the block, said block and table being provided with openings to receive a round tapering cam 27, the function of which will presently be explained.

28 denotes radial slides recessed in the block and adapted to move over the top of the table, two or more of said slides being provided at their outer ends with metallic strips 29, outside of which a rubber band 30 is placed. The inner ends of these slides engage tapering cam 27. The hat to be trimmed is placed upon the table, the block lying loosely within the crown, and when the cam is raised the slides are forced outward, radially expanding the metallic strips and rubber band and clamping the body of the hat firmly in place. Cam 27 is simply a round tapering cam. Below it and rigidly secured thereto, so as to move with it, is an oval tapering cam 31, the function of which will presently be explained. The sides of cams 27 and 31 lie at the same angle of inclination to the carrying-shaft, and both may be raised in any ordinary simple or preferred manner. They are secured to the vertical carrying-shaft, so as to turn with it, but have vertical movement independently thereof by means of a cross-pin 32, which passes through a slot 33 in the carrying-shaft. In Figs. 1 and 2 I have shown cross-pin 32 as secured to a rod 34, which extends up through the carrying-shaft, said rod being operated by a treadle 35, which is shown in Fig. 1 as mounted in a standard 36. In this form, to raise the two cams and lock the hat in position on the table and perform the other functions of said cams, presently to be described, the operator simply places his foot upon the treadle, raising the rod, cross-pin, and cams, and holds them in the raised position until the carrying-shaft has made a single revolution, as will presently be described. In Figs. 3 and 4 the carrying-shaft is shown as provided with an external thread 37, which is engaged by a hand-wheel 38. The two cams in both forms are provided with sleeves 39, which in this form are provided with central openings large enough to receive the thread loosely, the lower end of the sleeve or cam 31 resting on the central hub of the hand-wheel.

Below the hand-wheel in Figs. 3 and 4 and below the sleeve of cam 31 in Figs. 1 and 2 are collars 40, which limit the downward movement of the cams and support the weight of the carrying-shaft and the parts it supports, said cams being heavy enough so that they will drop by gravity as soon as the operator removes his foot from the treadle or turns the hand-wheel down.

41 denotes the cutter, which is carried by an arm 42, being detachably secured thereto in any suitable manner. This arm has at its inner end a sleeve 43, which is rigidly locked to a shaft 44 by a set-screw or in any suitable manner. This shaft is shown in Fig. 1 and in dotted lines in Fig. 5, and is mounted in brackets 45, extending upward from a slide 46, which I term the "cutter-slide," said slide moving in ways in an irregularly-shaped sliding carrier 47, a portion of which slides in a casing 48, which is rigidly secured to upright 8. An arm 47ª extends outward through an opening 49 in the side of the casing, and has at its outer end an angle-arm 47ᵇ, in which are formed the ways in which the cutter-slide 46 moves, the independent movement of the cutter-slide being for purposes of adjustment only. The cutter-slide is provided with a slot 50, and is locked in position by a set-screw 51, which passes through said slot and engages angle-arm 47ᵇ. At the forward end of the cutter-slide is a plate 52, which may be either part of the slide itself or rigidly secured thereto. This plate in use lies under the hat-brim, and is provided with an opening 53, through which the cutter passes after passing through the hat-brim.

54 is a yielding presser, made ordinarily of stiff leather and attached to the cutter-arm, which acts to hold the brim down upon plate 52 and prevents it from doubling, the brim to be trimmed lying between plate 52 and the yielding presser, the cutter, which is of ordinary form, having a cutting-edge on its side. At the inner end of shaft 44 is a bevel-gear 55, which engages a bevel-gear 56 on a shaft 57, mounted in brackets 58, extending outward from the side of angle-arm 47<sup>b</sup>. Bevel-gear 56 is secured to shaft 57 by means of a spline 59, so as to permit said gear to move longitudinally on said shaft, although it must at all times rotate therewith, said gear being constantly held in engagement with gear 55 by means of an angle-arm 60, extending inward from cutter-slide 46 and having an opening through which shaft 57 passes, so that change in the adjustment of the cutter-slide relatively to slide 47 does not effect the engagement of bevel-gears 55 and 56. At the inner end of shaft 57 is an arm 61, having at its outer end a pin 62, (see Fig. 3,) engaging a slot 63 at the upper end of a rod 64, which slides in guides 65, extending outward from upright 8.

66 denotes a roller mounted on rod 64, which is engaged for the purpose of forcing the rod down by the beveled inner end of a slide 67, moving in ways upon upright 8. The movement of this slide is controlled by an operating-lever 68, the lower end of which is rigidly secured to a rock-shaft 69, mounted in upright 8 and in a bracket 70, extending upward from the bed. The operating-lever is connected to slide 67 by a link 71. At the lower end of rod 64 is a slot 72, which is engaged by a pin 73, extending outward from an arm 74. This arm is rigidly secured to a rock-shaft 75, mounted in a bracket 76, depending from the bed. At the other end of said shaft is an arm 77, which is slotted or forked at its outer end to engage a pin 78, extending outward from a stop-block 79, which is adapted to engage opening 22 in disk 20 to stop the machine at the completion of each rotation of the carrying-shaft. In practice this block is provided with a shank, which extends upward into a recess 80 in arm 6 and the bed, said recess and shank being indicated by dotted lines only in Fig. 3. When the machine is started, the block is moved upward out of opening 22 by arm 77 on rock-shaft 75.

As already stated, bevel-gear 18, which is mounted on post 9, is a broken or mutilated gear. The construction will be clearly understood from Fig. 1 in connection with Figs. 9 and 10. A number of teeth—three in the present instance—are removed from this gear, leaving an opening 81. 82 (see Fig. 10) is a piece pivoted upon the top of gear 18 and adapted to swing down into opening 81 and fill it, said piece containing just the number of gear-teeth—three in the present instance—required to complete the wheel when the piece is in position in the opening.

83 denotes a strong spring which acts to hold piece 82 in the raised position.

84 (see Fig. 9) denotes a pin which slides freely through the bed and arm 6, the lower end thereof resting upon the top of piece 82.

85 denotes a spring acting to hold pin 84 in the raised position, said spring bearing upon the bed and upon the head 86 of the pin. At the inner end of rock-shaft 69 is an arm 87, which engages the head of pin 84, acting to press it down and to force piece 82 into opening 81, thereby completing the complement of teeth of the broken gear when shaft 69 is oscillated. Arm 87, in the present instance, is a cross-piece, and is provided at its opposite end with a pin 88, which engages the bed and acts as a stop to limit the oscillation of shaft 69 in that direction. In order to insure the stoppage of the machine with absolute certainty at the completion of each revolution of the carrying-shaft, I provide in addition a stop-block 79, operated through rock-shaft 75, and engaging opening 22 in disk 20, still another stop operating in connection with rock-shaft 69.

89 (see Fig. 11) is a bifurcated arm having a collar 90, which is rigidly secured to shaft 69. This arm engages a stop-pin 91, the lower end of which is beveled to correspond with notch 21 in disk 20. (See Fig. 3.) This pin is provided with a collar 92 within a casing 93, which fits in a correspondingly-shaped recess in the bed, said casing being preferably provided with a shoulder 94 and the bed being countersunk to receive said shoulder. Within the casing is a strong coil-spring 95, which acts to throw the pin downward into the engaged position the instant the shaft is oscillated.

The operation of this portion of the machine is as follows: The operator having placed the hat to be trimmed over block 25, the brim resting upon table 26 and plate 52 lying under the brim, raises cam 27, as already described, which clamps the hat in position. The operator then swings operating-lever 68 forward and instantly swings it back again. The forward movement of said lever causes beveled slide 67 to engage roller 66 on vertical rod 64 and move the latter downward. This movement oscillates shaft 75 in the manner already described and lifts stop-block 79 out from opening 22 in disk 20. The oscillation of shaft 69 by the movement of the operating-lever acting at the same time to disengage stop-pin 91 from notch 21 in disk 20, and also by means of arm 87, acting to press down pin 84, which forces piece 82 into opening 81 in bevel-gear 18, thus completing said gear and placing it in engagement with bevel-pinion 5 on shaft 2, it being of course understood that when the machine is in use this shaft is constantly in rotation. At the same instant that the stops are disengaged from disk 20 and the broken bevel-gear 18 is completed by the pressing down of piece 82 into the opening, thus starting the machine, shaft 57 is oscillated by the same movement of vertical rod 64 through arm 61, and by means of bevel-gears 55 and 56 swings the cutter-arm 42 downward and places the cutter in operative position. 96 is a strong coil-spring, one end of which is attached to one of the guides 65, the other being attached to rod 64. The action of this spring is to draw vertical rod 64 upward the instant the rotation of disk 20 is completed, so that stop-block 79 can be forced down into opening 22. The instantaneous connection of the bevel-gear teeth on piece 82 with the teeth of bevel-pinion 5 carries bevel-gear 18 forward sufficiently to cause the opening to pass the bevel-pinion, so that the rotation of bevel-gear 18, the face-gear, disk, and the caring-shaft will continue until the opening 81 again comes opposite to bevel-pinion 5. At this instant, in addition to the disengagement of bevel-gear 18 from pinion 5, stop-block 79 will engage opening 22 in disk 20 and stop-pin 91 will engage notch 21, so that the machine is stopped instantly after having completed an exact revolution. The instant the stop-block drops into opening 22 in disk 20 spring 96 will act to draw vertical rod 64 upward, which oscillates shafts 57 and 44 in the opposite direction and swings the cutter-arm and cutter to the raised position, as in Figs. 1 and 5.

Turning now to Figs. 4 to 7 and 14 to 17, I will describe the adjustable mechanism which determines the oval to be traced by the knife during each revolution of the carrying-shaft. In practice cam 31 is a tapering oval cam, a cross-section of which at any portion of its height is the ordinary oval of a hat-brim, the long diameter being approximately an inch and one-half greater than the short diameter. A cord 97, attached to arm 11 on the carrying-shaft, runs over a pulley 98. At the lower end of the cord is a weight 99. This weight acts to hold cam 31 in contact with a bevel-wheel 100, mounted upon upright 8. In practice a spring may be substituted for the cord and weight, if preferred. The action of the cord and weight, or the spring, if used, will be clearly understood from Fig. 1, in connection with which see Figs. 5, 16, and 17. The carrying-shaft, cams 27 and 31, the table, &c., will be held constantly in engagement with bevel-wheel 100, which serves as a stop, the movement of said parts by the cord and weight being toward the right, as seen in Fig. 5.

101 denotes plates secured to the top of oscillating post 9, the top of the post being in practice squared, so that the plates may be rigidly secured thereto. These plates support a regulating-slide 12, which in the present instance consists of upper and lower plates $12^a$ and $12^b$ and blocks $12^c$, which lie between plates 101 at the top of the post and to which the upper and lower plates of the slide are attached. The lower plate is provided with a slot 102, through which the post passes, and the upper plate is provided with a slot 103.

104 denotes a guideway having on its under side a stud 105, which passes through slot 103 and engages a socket 106 in the top of the post, said stud turning freely in the socket. At the forward end of slide 12 is an arm 107, which extends forward and engages the round tapering cam 27.

108 is a spring, one end of which bears against the post, the other passing through an opening in the inner block $12^c$ and bearing against an angle-piece 109 at the outer end of plate $12^b$, the action of said spring being to force the slide toward the carrying-shaft and keep arm 107 constantly in engagement with the round tapering cam. As has already been stated, this cam, when raised, forces out a set of slides which clamp the hat in position, in addition to which it is engaged by an arm 107, which regulates the position of slide 12, the purpose of which will presently be fully explained.

110 is a threaded shaft in guideway 104, said shaft being mounted in the ends of the guideway, one end of the shaft extending through the guideway and being provided with a crank 111.

112 is a block having a central opening threaded to receive the threaded shaft and adapted to be moved longitudinally in the guideway by rotation of the shaft.

113 is a link, one end of which is pivoted to the block, the other being pivoted to a stud 114 in sliding carrier 47. This construction enables the operator to so adjust the cutter as to give the brims any required oval. Stud 114 is threaded at its lower end, the thread engaging a nut 115, which is socketed in a recess 116 in the bottom of the sliding carrier, (see Fig. 13,) the nut being angular, so that the sides of the recess will hold it against rotation when the stud is turned. At the upper end of the stud is an operating-handle 117, rigidly secured thereto, the collar by which the handle is secured in place resting upon a washer 118. It will be noticed (see Figs. 5 and 6) that the stud passes through a slot 119 in the sliding carrier, so that when the stud has been loosened by a backward movement of the handle the sliding carrier is free to be moved independently of block 112.

120 is a sliding pin mounted in a bracket 121 upon casing 48. This pin is held in the retracted position by a spring 122. It will of course be understood that all of the adjustments are made at the stationary position of the machine, and that, through the action of the mechanism already described, the machine always stops with the parts in a certain definite position. A recess $120^a$ (see dotted lines in Fig. 6) is provided in the side of the sliding carrier, which is adapted to be engaged by the inner end of the pin when the latter is pressed inward, thereby locking the sliding carrier in position while adjusting the position of block 112.

In the manufacture of hats it is the practice to cut down the brims, so as to give the same width of brim to all sizes of hats. For instance, if an inch and one-half brim is given to a seven-inch hat the same width of brim is given to a seven-and-one-half-inch hat—that is to say, the cut is made an inch and one-half from the crown without regard to the size of the crown, the brim being no wider in seven-and-one-half-inch hats than in seven-inch hats. In order to accomplish this result I provide a stud 126 on the under side of the guideway, which engages a slot 125, which lies at the same angle to a line running longitudinally of the regulating-slide that the side of cam 27 lies to the line of its vertical movement, so that having once adjusted the parts to the smallest-sized hat that it is required to operate upon, it follows that when cam 27 is raised to a higher position, as when a larger-sized hat is to be operated upon, the guideway will be correspondingly deflected from the longitudinal line of the regulating-slide by the engagement of stud 126 with slot 125, it being understood, of course, that the regulating-slide is free to reciprocate upon oscillating post 9, but can only oscillate with said post, but that the guideway oscillates independently of said post. Slot 125 may, if preferred, be made in the upper plate 12$^a$ of the regulating-slide. I preferably, however, interpose a plate 123 between the guideway and the regulating-slide and form the slot in said interposed plate. This plate is provided with a stud 124, which engages a hole in plate 12$^a$, and is locked in position by a bolt 127, which passes through another hole or preferably a slot in said plate and engages the regulating-slide, thus locking plate 123 firmly to the regulating-slide. The object of this special construction of parts is to permit absolutely accurate adjustment in assembling. When once adjusted, however, plate 123 remains fixed in use.

The operation is as follows: Suppose, for example, that it is required to cut a one-and-one-half-inch brim and to reproduce in the brim the oval of cam 31, the operator loosens set-screw 51 and moves cutter-slide 46 in or out until the cutter is in position to cut the required width of brim. This adjustment can be made with cams 27 and 31 either raised or lowered and with or without a hat-body upon the table. This follows necessarily, owing to the fact that holding-slides 28 and arm 107 are engaged by cam 27 at the same instant, so that the radial movement of the holding-slides, as when clamping a hat-body, and the outward movement of regulating-slide 12, which controls the position of the sliding carrier, and consequently of the cutter, is always the same. In practice I place a scale upon angle-arm 47$^b$ of the sliding carrier and adjust the cutter by this scale while set-screw 51 is loosened. The operator then tightens up set-screw 51, which locks the cutter-slide to the sliding carrier. This adjustment does not require to be changed until the width of the brim is changed. Suppose now that it is required to produce a brim one and one-half inch wide at the ends, but wider at the sides, so that a curl may be formed, the operator pushes in pin 120, causing it to engage hole 120$^a$ to lock the sliding carrier against movement. He then unlocks link 113 from sliding carrier 47 by moving operating-handle 117 backward, which loosens stud 114 in the nut, so that the sliding carrier is no longer clamped by the washer and the nut, and stud 114 and the nut are left free to slide along slot 119 and the recess. The operator then, by means of crank 111, rotates threaded shaft 110 and moves block 112 inward from the position shown in Fig. 5—for instance, as shown in Fig. 6. Should the operator desire to cut the brims less than one and one-half inch wide at the sides without change at the ends, as indicated in Fig. 8, he would move block 112 outward from the position shown in Fig. 5—for example, as in Fig. 7. The width at which any special adjustment of the block will cut the brims at the sides is indicated by a scale upon guideway 104. Having effected the necessary adjustment of the block to give the required width of brim at the sides, stud 114 is clamped to the sliding carrier by giving operating-handle 117 sufficient movement forward to lock the parts. The operator then releases pin 120 and the spring forces it outward again. This adjustment will be clearly understood from Fig. 4, in connection with Figs. 5, 6, 7, and 14. It will be seen in Fig. 4 that the pivotal point of link 113 to the block is precisely in line with stud 105, which constitutes the pivotal point of the guideway. It follows, therefore, that during the rotation of the table the sliding carrier, and consequently the cutter, will not change its position at all, so that the oval traced by the cutter must be identical with the oval of cam 31, the latter being held continually in contact with bevel-wheel 100, as already described. When, however, the pivotal point of the link to the block is thrown off center in either direction, it follows that the brims must be cut either wider or narrower at the sides than they are at the ends, for the reason that when arm 11, the carrying-shaft, table, guideway, &c., sw g inward toward the cutter, as when either of the sides of cam 31 come in contact with bevel-wheel 100, block 112, to which link 113 is pivoted, is either moved inward or outward, moving the sliding carrier also, so that the cutter is either drawn toward the crown at that instant or moved away therefrom, as in Figs. 6 and 14, in which instance the brim is cut wider at the sides than at the ends. It will be apparent that when the parts are in the position shown in Figs. 4 and 5 oscillation of the guideway will not affect the position of the sliding carrier and the cutter, for the reason that the pivotal point of link 113 is in line with the pivotal point of the guideway; but when the pivotal point of the link is moved within the pivotal point of the guideway, by that I mean toward the carrying-shaft, the inward movement of arm 11, the carrying-shaft, table, guideway, &c., must move the sliding carrier, and with it the cutter, outward away from the carrying-shaft at the same instant that the carrying-shaft swings toward the cutter, so that the line of the cut, instead of being at the same distance from the crown all the way around, will be at a greater distance from the crown at the sides, as is clearly indicated in Fig. 6, thus giving additional brim at the sides to form a curl, if required, by the prevailing fashion. If, however, block 112 is moved outward from the pivotal point of the guideway, as in Fig. 7, the opposite result will be produced—that is to say, the brim will be cut narrower at the sides than at the ends, it being apparent that when the guideway, carrying-shaft, table, &c., swing toward the cutter the sliding carrier and cutter, instead of being left stationary, as in Fig. 5, or being swung outward away from the carrying-shaft, as in Fig. 6, will be swung inward toward the carrying-shaft, thus bringing the cutter nearer to the crown while the sides are being trimmed than while the ends are being trimmed. Suppose that it is required that the brim be an inch and one-half wide at the ends and two inches wide at the sides, the operator would set the cutter-slide at the one-and-one-half-inch mark in the scale on angle-arm $47^b$ and would set block 112 at the two-inch mark in the scale on guideway 104. It should be borne in mind that the engagement of stud 126 with slot 125 is an essential feature of construction to make the machine self-adjusting to cut the same width and shape of brim upon all sizes of hats. This result is produced by giving to slot 125 the exact angle of inclination that is required to compensate for the angle of inclination of cam 27. This will be clearly understood from Fig. 6, in which the parts are all shown in operative position. It will be seen that the outward movement of the regulating-slide, caused by the upward movement of cam 27, is just equalized by the oscillation of the guideway, which results from the engagement of stud 126 with inclined slot 125, so that the position of the sliding carrier and the cutter is not changed in the slightest. It will be remembered that cams 27 and 31 move together, and that simultaneously with increased outward movement of the holding-slides caused by cam 27, which would carry the body nearer to the cutter, the carrying-shaft, table, &c., are swung outward away from the cutter through the engagement of cam 31 with bevel-wheel 100. The two movements thus equalize each other, so that so far as these parts are concerned no change would be made in the width of the brim. In addition to these movements, however, the upward movement of cam 27, through the engagement of arm 107, forces out the regulating-slide, and in order to prevent the outward movement of this slide from changing the position of the sliding carrier and the cutter it is necessary to provide the inclined slot in the regulating-slide to be engaged by the stud on the guideway, so that the inward and outward movements of the regulating-slide will simply oscillate the guideway relatively to the sliding carrier, but without changing the position of the pivotal point of link 113 to the block in the guideway, and consequently without changing the position of the sliding carrier and the cutter.

Having thus described my invention, I claim—

1. The combination, with the cutter, the oscillating post, and arm 11, extending therefrom, of a carrying-shaft mounted in said arm, clamping mechanism carried by said shaft, a round tapering cam for actuating the clamping mechanism, an oval tapering cam moving therewith, suitable means for moving the carrying-shaft toward the cutter, a stop engaged by the oval cam, and suitable means for raising and lowering said cams, so that when the clamping mechanism is expanded outward toward the cutter by the round cam the carrying-shaft and the parts carried thereby are moved away from the cutter by the engagement of the oval tapering cam with the stop, substantially as described.

2. The oscillating post, arm 11, a carrying-shaft mounted in said arm, and clamping mechanism carried by said shaft, in combination with a cutter, a sliding carrier by which it is carried, cams 27 and 31, acting as described, a regulating-slide carried by the oscillating post and provided with an arm engaging cam 27 and an inclined slot, a guideway pivoted in the oscillating post, a stud on the guideway engaging said slot, and a link 113, connecting the guideway and the sliding carrier.

3. In a machine of the class described, a cutter, a sliding carrier therefor, an oscillating arm, and a carrying-shaft mounted therein, in combination with suitable clamping mechanism upon the carrying-shaft, a round tapering cam for actuating the clamping mechanism, the regulating-slide having an inclined slot and an arm engaging said cam, a pivoted guideway having a stud engaging said slot, an adjustable block in said guideway, and a link, one end of which is pivoted to said block and the other to the sliding carrier.

4. The oscillating post, arm 11, and the carrying-shaft, in combination with cams 27 and 31, stop 100, suitable hat-clamping mechanism, the regulating-slide, the guideway, the sliding carrier, a cutter carried thereby, and a link connecting the sliding carrier and the guideway.

5. The combination, with the carrying-shaft, cam 27, an oscillating arm in which said shaft is mounted, and the clamping mechanism, of the guideway, the regulating-slide, the sliding carrier, a link connecting the guideway and sliding carrier, and the cutter.

6. The combination, with the carrying-shaft having cam 27, the sliding carrier, and the regulating-slide having an inclined slot and an arm 107, of the guideway having a stud engaging said slot, an adjustable block in said guideway, and a link connecting said block and the sliding carrier.

7. The combination, with the sliding carrier, the regulating-slide having an arm 107 and an inclined slot, and the clamping mechanism, of cam 27, the guideway having a stud engaging said slot and an adjustable block, and a link connecting said block with the sliding carrier.

8. The sliding carrier and the cutter, in combination with the oscillating post having an arm 11, the carrying-shaft mounted in said arm, clamping mechanism at the upper end of said shaft, vertically-movable tapering cams 27 and 31 for operating the clamping mechanism and for determining the shape of the brim, the cross-section of cam 27 being a circle and of cam 31 being an oval, the regulating-slide having an arm engaging cam 27 and an inclined slot, a guideway pivoted in the oscillating post and having a stud engaging said slot, a block carried by the guideway, and a link connecting said block with the sliding carrier, whereby when the pivotal point of the link to the block is on center with the pivotal point of the guideway the oval of cam 31 will be traced by the cutter in trimming a brim, when the block is moved inward toward the carrying-shaft the cutter will cut a brim wider at the sides than at the ends, and when the block is moved outward from the carrying-shaft the cutter will cut a brim narrower at the sides than at the ends.

9. The frame-work having a stop 100, the sliding carrier, and the cutter, in combination with the oscillating post having an arm 11, the carrying-shaft mounted in said arm, clamping mechanism at the upper end of said shaft, vertically-movable tapering cams 27 and 31 for operating the clamping mechanism and for engaging the stop, the cross-section of cam 27 being a circle and of cam 31 being an oval, the regulating-slide having an arm engaging cam 27 and an inclined slot, a guideway pivoted in the oscillating post and having a stud engaging said slot, a block carried by the guideway, a link connecting said block with the sliding carrier, and means for holding cam 31 in contact with the stop.

10. In a machine of the class described, the combination, with the clamping mechanism, the cutter, and the sliding carrier, of a tapering cam 27, which expands the clamping mechanism, the regulating-slide having an arm which is engaged by said cam simultaneously with the clamping mechanism, the regulating-slide having an inclined slot, a pivoted guideway having a stud engaging said slot, an adjustable block carried by the guideway, and a link connecting said block with the sliding carrier, substantially as described.

11. In a machine of the class described, the combination, with the clamping mechanism, the cutter, and the sliding carrier, of a tapering cam 27, which expands the clamping mechanism, the regulating-slide having an arm which is engaged by said cam simultaneously with said clamping mechanism, a plate 123, adjustably secured to said slide and having a slot 125, a pivoted guideway having a stud engaging said slot, an adjustable block in said guideway, and a link connecting the block with the sliding carrier.

12. In a machine of the class described, the combination, with the clamping mechanism, the cutter, and the sliding carrier, of a tapering cam 27, which expands the clamping mechanism, the regulating-slide having an arm which is engaged by said cam simultaneously with the clamping mechanism, the regulating-slide having an inclined slot, a pivoted guideway having a stud engaging said slot, a threaded shaft in said guideway, a block in the guideway through which said shaft passes, and a link pivoted to said block and to the sliding carrier, so that rotation of said shaft will adjust the block either side of the pivotal point of the guideway, as and for the purpose set forth.

13. In a machine of the class described, the combination, with the clamping mechanism, the cutter, and the sliding carrier having a slot 119, of a tapering cam 27, which expands the clamping mechanism, the regulating-slide having an arm which is engaged by said cam simultaneously with the clamping mechanism, the regulating-slide having an inclined slot, a pivoted guideway having a stud engaging said slot, an adjustable block in said guideway, a link, one end of which is pivoted to said block and the other to a stud 114 lying in the slot in the sliding carrier, suitable means for clamping the stud to the sliding carrier, and a pin 120, whereby the sliding carrier may be locked in place when the stud is loosened in adjusting the block.

14. In a machine of the class described, the combination, with the sliding carrier, of the cutter, a shaft by which it is carried, a shaft 57, having an arm 61, bevel-gears on said shafts, and suitable means for oscillating said shafts, whereby the cutter may be thrown into and out of operative position.

15. In a machine of the class described, the carrying-shaft having a gear 24, a gear 19, meshing therewith, a disk 20, secured to gear 19 and having an opening 22, a stop-block adapted to engage said opening, rock-shaft 75, having an arm 77, which carries the block and an arm 74, and a spring-actuated rod engaging arm 74 to force the block into the opening when the revolution of the disk is completed.

16. In a machine of the class described, the combination, with the carrying-shaft having a gear 24, of gear 19, disk 20, and bevel-gear 18, rotating together, said disk having a notch 21 and said bevel-gear being mutilated and having a piece 82 to complete it, a driving-pinion 5, engaging said gear, a stop-pin 91, adapted to engage the notch, a rock-shaft 69, and intermediate connections, substantially as described and shown, whereby piece 82 is caused to engage the driving-pinion and the pin is disengaged from the notch simultaneously.

17. In a machine of the class described, the carrying-shaft having a gear 24, gear 19, meshing therewith, a disk 20, having a notch 21 and an opening 22 and a mutilated bevel-gear 18, secured to gear 19, and a pivoted piece 82, which completes the bevel-gear, in combination with operating-lever 68, rock-shafts 69 and 75, a spring-actuated rod 64, a block and pin engaging said opening and notch, respectively, and intermediate connections, substantially as described and shown, whereby a movement of the operating-lever causes piece 82 to complete gear 18 and simultaneously withdraws the stop-block and pin from the disk.

18. The carrying-shaft having a gear 24, gear 19, meshing therewith, a disk 20, having an opening 22 and a mutilated bevel-gear 18, secured to gear 19, and a pivoted piece 82, which completes the bevel-gear, in combination with the cutter-shafts 44 and 57, bevel-gears on said shafts, an operating-lever 68, rock-shafts 69 and 75, a spring-actuated rod 64, a block engaging said opening, and intermediate connections, substantially as described and shown, whereby a movement of the operating-lever causes piece 82 to complete gear 18 and simultaneously withdraws the stop-block from the disk and also throws the cutter into operative position.

19. In a machine of the class described, the combination, with the sliding carrier, of the cutter, a shaft by which it is carried, having a bevel-gear 55, an adjustable slide in which said shaft is mounted, shaft 57, having sliding bevel-gear 56, an arm 60, extending from the slide and moving freely over shaft 57, thereby holding the bevel-gears in engagement, and suitable means for oscillating shaft 57 to throw the cutter into and out of operative position.

20. In a machine of the class described, the combination, with a cutter, a sliding carrier on which it is mounted, and a regulating-slide having an arm 107, of cam 27, engaged by said arm, an oscillating guideway actuated by the regulating-slide, an adjustable block in said guideway, and a link connecting said adjustable block with the sliding carrier, as and for the purpose set forth.

21. In combination, in a machine of the class described, the oscillating post, the carrying-shaft, vertically-movable cams 27 and 31, stop 100, the sliding carrier, the regulating-slide, the oscillating guideway, an adjustable block therein, and a link connecting the guideway with the sliding carrier, substantially as described.

22. In combination, the carrying-shaft, hat-clamping mechanism and vertically-movable cams 27 and 31 thereon, the cutter, the sliding carrier, the oscillating guideway having an adjustable block, a link connecting the adjustable block and the sliding carrier, suitable mechanism for rotating the carrying-shaft, intermediate clutch mechanism, and suitable intermediate connections whereby when motion is imparted to the carrying-shaft the cutter is swung into operative position and at the completion of the revolution the carrying-shaft is stopped and the cutter thrown out of operative position.

23. In a machine of the class described, the combination, with a frame having a stop 100, an oscillating arm, a carrying-shaft mounted in said arm, hat-clamping mechanism thereon, and the cutter, of vertically-movable cams 27 and 31 on said shaft, suitable means for holding cam 31 in contact with the stop, the regulating-slide, and intermediate connections between said slide and the cutter.

24. In a machine of the class described, the sliding carrier and the cutter mounted thereon, in combination with vertically-movable cams 27 and 31, stop 100, the regulating-slide having an inclined slot, an oscillating guideway having a stud engaging said slot, an adjustable block in said guideway, and a link connecting the block to the sliding carrier, as and for the purpose set forth.

25. In a machine of the class described, the sliding carrier and the cutter mounted thereon, in combination with the regulating-slide having an inclined slot, hat-clamping mechanism, a vertically-movable tapering cam which actuates the clamping mechanism and the regulating-slide simultaneously, an oscillating guideway having a stud engaging said slot, an adjustable block in said guideway, and a link connecting the block to the sliding carrier, as and for the purpose set forth.

26. In a machine of the class described, the sliding carrier and cutter and a frame having a stop, in combination with suitable clamping mechanism, the regulating-slide, oscillating guideway, a link pivoted to the sliding carrier and adjustably connected to the guideway, a vertically-movable round tapering cam which actuates the clamping mechanism and the regulating-slide, an oval tapering cam which engages the stop, and suitable means for holding said cam in contact therewith.

In testimony whereof I affix my signature in presence of two witnesses.

SAMUEL T. NEWMAN.

Witnesses:
A. M. WOOSTER,
ALMIRA CONNER.